(12) United States Patent
Wang et al.

(10) Patent No.: US 10,433,583 B2
(45) Date of Patent: Oct. 8, 2019

(54) HEATING MODULE OF ELECTRONIC CIGARETTE ATOMIZER

(71) Applicant: O-NET AUTOMATION TECHNOLOGY (SHENZHEN) LIMITED, Shenzhen, Guangdong (CN)

(72) Inventors: Feng Wang, Guangdong (CN); Fucheng Yang, Guangdong (CN); Fei Shen, Guangdong (CN); Bo Zhou, Guangdong (CN)

(73) Assignee: O-NET AUTOMATION TECHNOLOGY (SHENZHEN) LIMITED, Shenzhen (CN)

( * ) Notice: Subject to any disclaimer, the term of this patent is extended or adjusted under 35 U.S.C. 154(b) by 522 days.

(21) Appl. No.: 15/212,229

(22) Filed: Jul. 16, 2016

(65) Prior Publication Data

US 2016/0324218 A1    Nov. 10, 2016

Related U.S. Application Data

(63) Continuation of application No. PCT/CN2014/093029, filed on Dec. 4, 2014.

(30) Foreign Application Priority Data

Sep. 4, 2014  (CN) .......................... 2014 1 0448259

(51) Int. Cl.
  *A24F 47/00*     (2006.01)
  *B21J 15/02*     (2006.01)
  (Continued)

(52) U.S. Cl.
  CPC ............ *A24F 47/008* (2013.01); *A24F 47/00* (2013.01); *B21J 15/02* (2013.01); *B22F 3/14* (2013.01); *B22F 3/16* (2013.01); *B23K 31/02* (2013.01); *C04B 37/02* (2013.01); *C04B 37/021* (2013.01); *H05B 3/0014* (2013.01); *H05B 3/12* (2013.01); *H05B 3/141* (2013.01); *H05B 3/46* (2013.01); *H05B 3/54* (2013.01); *B23K 2101/32* (2018.08); *B23K 2101/36* (2018.08); *B23K 2103/10* (2018.08); *B23K 2103/12* (2018.08);
  (Continued)

(58) Field of Classification Search
  CPC . A24F 47/00; A24F 47/008; H05B 2203/014; H05B 2203/016; H05B 3/0014; H05B 3/12; H05B 3/141; H05B 3/46; H05B 3/54
  USPC .......................................................... 392/394
  See application file for complete search history.

(56) References Cited

U.S. PATENT DOCUMENTS

2017/0188626 A1*  7/2017  Davis .................... A24F 47/008

FOREIGN PATENT DOCUMENTS

| CN | 103876289 A | 6/2014 |
| CN | 203776163 U | 8/2014 |
| GB | 2504075 | * 1/2014 |

OTHER PUBLICATIONS

English Language Translation of CN2037761613.*
International Search Report of PCT Patent Application No. PCT/CN2014/093029 dated Jun. 11, 2015.

* cited by examiner

*Primary Examiner* — Dana Ross
*Assistant Examiner* — Joseph W Iskra

(57) ABSTRACT

A heating module of an electronic cigarette atomizer includes a ceramic rod, a connecting element and a heating wire. The heating wire is wound around the ceramic rod, the connecting element is connected to two ends of the heating wire respectively, and the ceramic rod is of a hollow micro-porous structure.

12 Claims, 6 Drawing Sheets

(51) Int. Cl.
*B22F 3/14* (2006.01)
*B22F 3/16* (2006.01)
*B23K 31/02* (2006.01)
*C04B 37/02* (2006.01)
*H05B 3/00* (2006.01)
*H05B 3/12* (2006.01)
*H05B 3/14* (2006.01)
*H05B 3/54* (2006.01)
*H05B 3/46* (2006.01)
*B23K 101/32* (2006.01)
*B23K 101/36* (2006.01)
*B23K 103/10* (2006.01)
*B23K 103/12* (2006.01)
*B23K 103/14* (2006.01)
*B23K 103/18* (2006.01)
*B23K 103/22* (2006.01)

(52) U.S. Cl.
CPC ...... *B23K 2103/14* (2018.08); *B23K 2103/18* (2018.08); *B23K 2103/22* (2018.08); *C04B 2237/403* (2013.01); *C04B 2237/405* (2013.01); *C04B 2237/406* (2013.01); *C04B 2237/407* (2013.01); *C04B 2237/64* (2013.01); *C04B 2237/765* (2013.01); *C04B 2237/84* (2013.01); *H05B 2203/014* (2013.01); *H05B 2203/016* (2013.01)

HEATING MODULE OF ELECTRONIC CIGARETTE ATOMIZER

CROSS REFERENCE TO RELATED APPLICATIONS

The present application is a Continuation application of PCT application No. PCT/CN2014/093029 filed on Dec. 4, 2014, which claims the benefit of Chinese patent application No. 201410448259.2 filed on Sep. 4, 2014, all the contents of which are hereby incorporated by reference.

TECHNICAL FIELD

The present patent application relates to the technical field of electronic cigarettes, and more particularly relates to a heating module of an electronic cigarette atomizer.

BACKGROUND

An electronic cigarette is also called a virtual cigarette, which has the same appearance as a cigarette and a taste similar to that of the cigarette and is mainly used for simulating a smoking feeling without influencing health for smoking cessation or replacement of the cigarette.

At present, an electronic cigarette product in the market comprises a heating module of an electronic cigarette atomizer. With reference to FIG. 1, it is a schematic view of a heating module for an atomizer of an existing electronic cigarette, wherein the heating module for the atomizer of the electronic cigarette comprises a glass fiber rope 10 and a heating wire, and the heating wire 11 is wound around the glass fiber rope 10. The glass fiber rope 10 permeates tobacco tar by means of a capillary phenomenon, and then an external voltage is applied to the heating wire 11, and the heating wire heats to atomize the tobacco tar.

However, during actual use, a requirement for a winding degree of the heating wire 11 on the glass fiber rope 10 is very high. On the one hand, if the heating wire 11 is too tightly wound around the glass fiber rope 10, partial glass fibers are easily broken, and then when the tobacco tar is atomized, there is a hidden trouble that the tobacco tar flies out of the glass fibers in the glass fiber rope 10 during smoking. On the other hand, if the heating wire 11 is too loosely wound around the glass fiber rope 10, a contact area between the heating wire 11 and the glass fiber rope 10 is easily reduced, and there is a hidden trouble that a surface of the glass fiber rope 10 is coked or there are problems that the glass fibers are low in permeation speed of the tobacco tar, are easily carbonized, and are poor in atomizing effect. Meanwhile, because the glass fiber rope 10 is of a flexible structure, after the heating wire 11 is wound around the glass fiber rope 10, there is a greater deviation in a constancy of its resistance value.

SUMMARY PATENT APPLICATION

An inventive objective of the present patent application is to overcome deficiencies in the prior art and address a problem that tobacco tar from an electronic cigarette flies out of a glass fiber rope.

Another inventive objective of the present patent application is to simplify a structure of a heating module of an electronic cigarette atomizer, and realize an automatic production and improve a consistency of a resistance value of a heating wire.

A technical scheme employed for addressing its technical problem by the present patent application is as follows: a heating module of an electronic cigarette atomizer comprises a ceramic rod, a connecting element and a heating wire, wherein the heating wire is wound around the ceramic rod; the connecting element is respectively joined with two ends of the heating wire; the ceramic rod is of a hollow micro-porous structure.

Optionally, the connecting element comprises two metal rings, the two metal rings are respectively disposed at two ends of the ceramic rod, and two ends of the heating wire are respectively connected to the metal rings by welding or riveting.

Optionally, an outer surface of the ceramic rod comprises a groove structure, the connecting element comprises two metal rings, the two metal rings and the ceramic rod are integrally sintered in a groove in the outer surface of the ceramic rod, and two ends of the heating wire are respectively connected to the metal rings by welding or riveting.

Optionally, the connecting element comprises two metal terminals, and the two metal terminals are respectively connected with the heating wire by welding or riveting.

Optionally, the ceramic rod and the connecting element are integrally sinter-molded.

Optionally, two ends of the ceramic rod comprise a step structure, and the metal rings are engaged in the step structure.

Optionally, the heating wire is made of a nichrome or titanium alloy material.

Optionally, the heating wire is made of a galvanized steel or copper alloy material.

Another technical scheme employed for addressing its technical problem by the present patent application is as follows: a heating module of an electronic cigarette atomizer comprises a ceramic rod and a heating wire, wherein the heating wire is wound around the ceramic rod; wherein the ceramic rod is of a hollow micro-porous structure; and the heating wire is directly joined with a lead of other elements connected with it by means of a welding manner.

Compared with the prior art, the heating module for the atomizer of the electronic cigarette of the present patent application has advantages and positive effects. Firstly, a hardness of the ceramic rod of the present patent application is higher than that of an existing glass fiber rope, and thus after the heating wire is wound around the ceramic rod, a resistance value can be accurately controlled and a deviation of the resistance value is reduced. Secondly, the ceramic rod in the heating module for the atomizer of the electronic cigarette of the present patent application is set to be hollow and microporous, and thus tobacco tar from the electronic cigarette rapidly permeates in comparison with that of the prior art. Meanwhile, a ceramic material has a good heat conducting property, and thus a heat energy produced by the heating wire is uniformly distributed on the ceramic rod after it is energized and an atomizing effect of the tobacco tar from the electronic cigarette is relatively good in comparison with those of the prior art. Finally, the heating module for the atomizer of the electronic cigarette of the present patent application is simple in structure, can perform the automatic production and lower the cost.

BRIEF DESCRIPTION OF THE DRAWINGS

FIG. 2b is a structural view of a heating module of an electronic cigarette atomizer of FIG. 2a.

FIG. 3b is a structural view of a heating module of an electronic cigarette atomizer of FIG. 3a.

FIG. 4b is a structural view of a heating module of an electronic cigarette atomizer of FIG. 4a.

DETAILED DESCRIPTION

To further understand objectives, construction features and functions thereof of the present patent application, reference is made to accompanying drawings below. It should be understood that specific examples described in this section may be merely used for explaining the present patent application, and not intended to limit the present patent application.

Embodiment I

Figure 1:
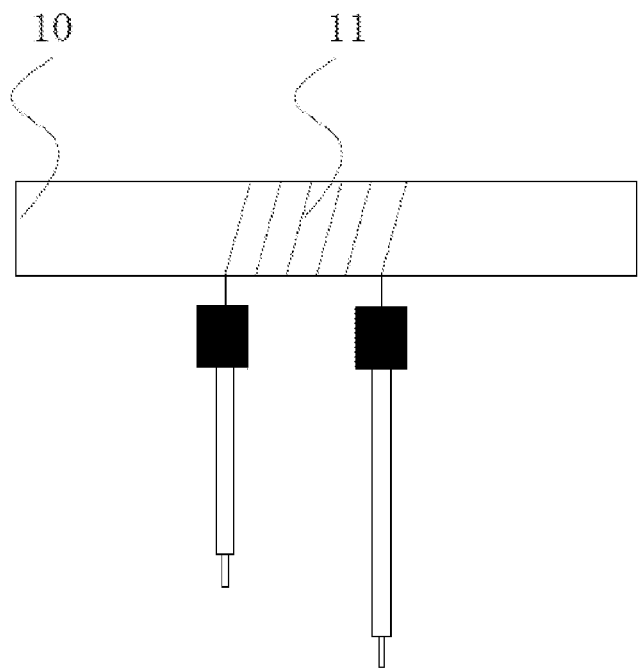
FIG. 1 is a schematic view of a heating module for an atomizer of an existing electronic cigarette.
Figure 2A:
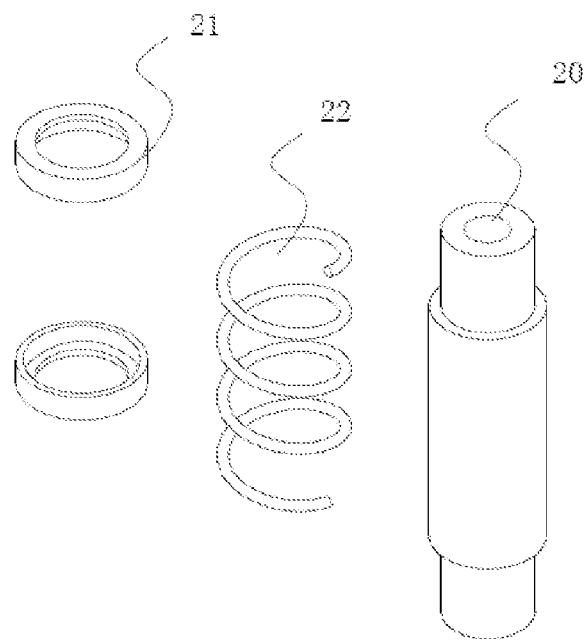
FIG. 2a is a schematic view of a heating module of an electronic cigarette atomizer according to a first embodiment of the present patent application.
Figure 2B:
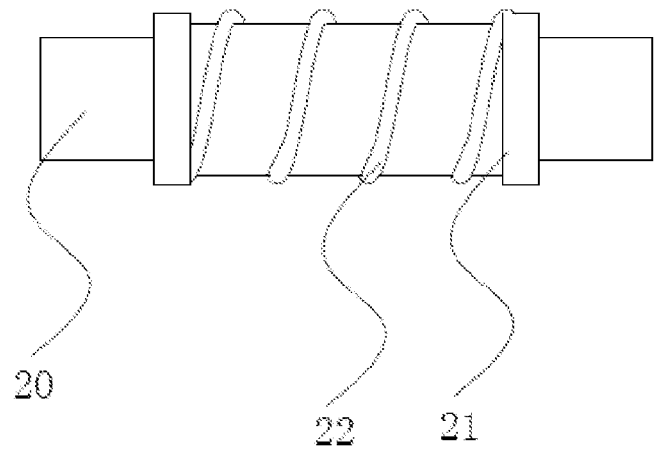

With reference to FIG. 2a, it is a schematic view of a heating module of an electronic cigarette atomizer according to a first embodiment of the present patent application. The heating module for the atomizer of the electronic cigarette comprises a ceramic rod 20, a connecting element 21 and a heating wire 22. Meanwhile, with reference to FIG. 2b, FIG. 2b is a structural view of a heating module of an electronic cigarette atomizer of FIG. 2a. Wherein, the heating wire 22 is set to be made of a nichrome or titanium alloy material, and wound around the ceramic rod 20. Its winding degree is set according to a size of a resistance value. The connecting element 21 comprises two metal rings, which are respectively pressed in two ends of the ceramic rod 20, and the connecting element 21 is joined with two ends of the heating wire 22 by welding or riveting.

Wherein, the ceramic rod 20 is of a hollow micro-porous structure. That is, the ceramic rod is made of a hollow micro-porous ceramic material. The ceramic rod comprises a step structure. Two metal rings may be engaged on the step structure, and the step structure is sinter-molded.

Wherein, the connecting element 21 is set to comprise conductive metal rings, for example, good conductors of a galvanized steel material, a copper alloy material and the like.

Embodiment II

Figure 3A:
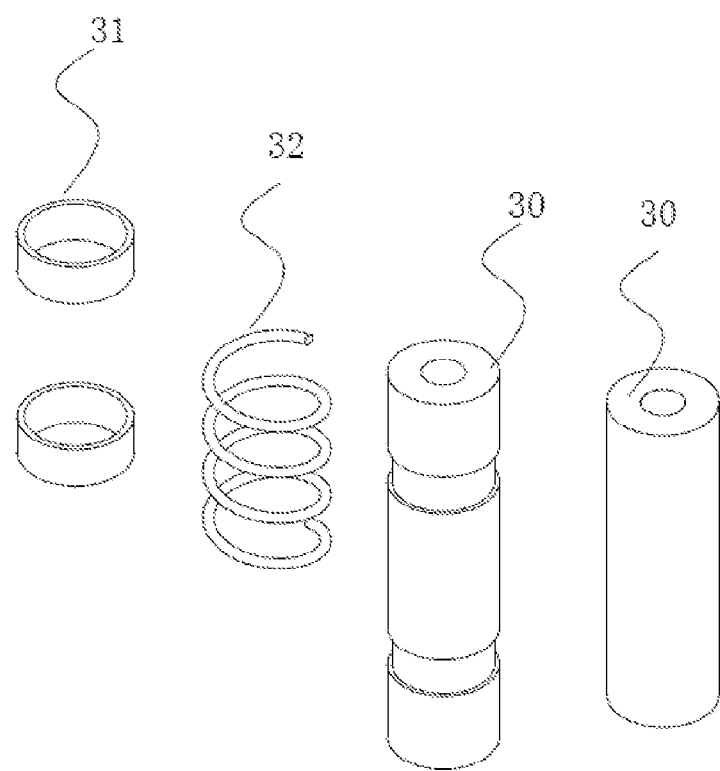
FIG. 3a is a schematic view of a heating module of an electronic cigarette atomizer according to a second embodiment of the present patent application.
Figure 3B:
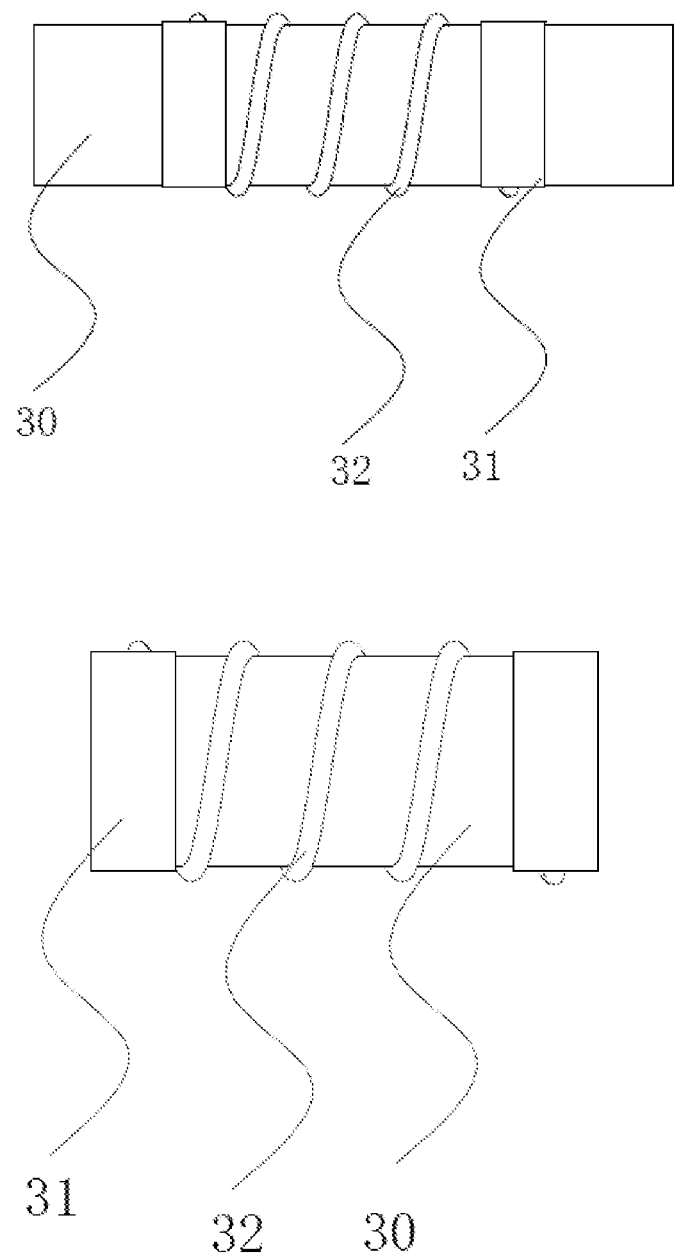

With reference FIG. 3a, FIG. 3a is a schematic view of a heating module of an electronic cigarette atomizer according to a second embodiment of the present patent application. The heating module for the atomizer of the electronic cigarette comprises a ceramic rod 30, a connecting element 31 and a heating wire 32. Wherein, the ceramic rod 30 is set to be of a hollow micro-porous structure, and the ceramic rod 30 and the connecting element 31 are integrally sinter-molded. Wherein the connecting element 31 is sintered in a groove in an outer surface of the ceramic rod 30 or at two ends of the ceramic rod 30. With reference to FIG. 3b, the connecting element 31 is set to comprise conductive metal rings, for example, good conductors of a galvanized steel material, a copper alloy material and the like.

With reference to FIG. 3b again, the heating wire 32 is set to be made of a nichrome or titanium alloy material, and wound around the ceramic rod 30. Its winding degree is set according to a size of a resistance value. The connecting element 31 comprises two metal rings, and the connecting element 31 is joined with two ends of the heating wire 32 by welding or riveting.

Embodiment III

Figure 4A:
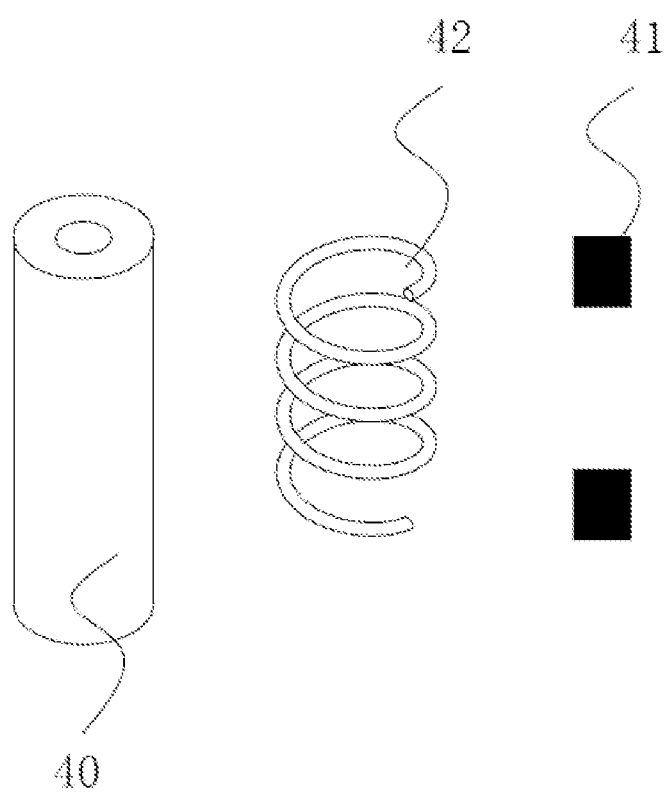
FIG. 4a is a schematic view of a heating module of an electronic cigarette atomizer according to a third embodiment of the present patent application.

With reference to FIG. 4a, FIG. 4a is a schematic view of a heating module of an electronic cigarette atomizer according to a third embodiment of the present patent application. The heating module for the atomizer of the electronic cigarette comprises a ceramic rod 40, a connecting element 41 and a heating wire 42. Wherein, the ceramic rod 40 is of a hollow micro-porous structure. The heating wire 42 is set to be made of a nichrome or titanium alloy material, and wound around the ceramic rod 40, and its winding degree is set according to a size of a resistance value.

Figure 4B:
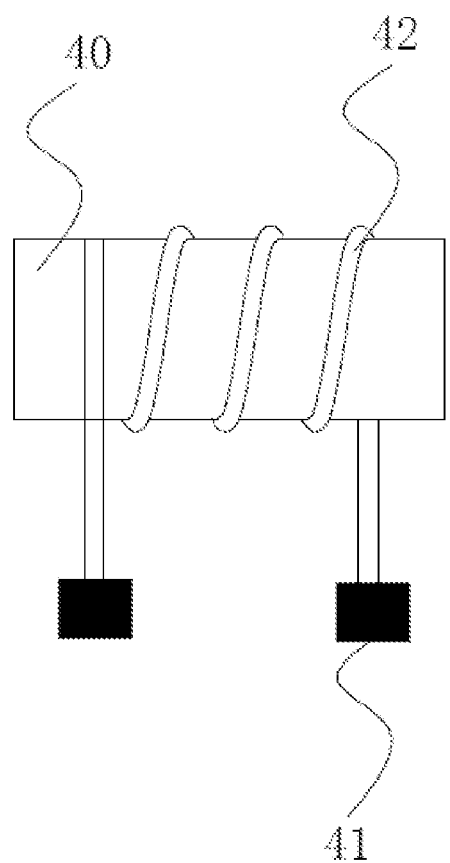

With reference to FIG. 4b again, the connecting element 41 is set to comprise two conductive metal terminals, for example, good conductors of a galvanized steel material, a copper alloy material and the like. Moreover, the connecting element 41 is disposed at two ends of the heating wire 42, and is connected with two ends of the heating wire 42 by means of a welding or riveting manner.

Embodiment IV

Figure 5:
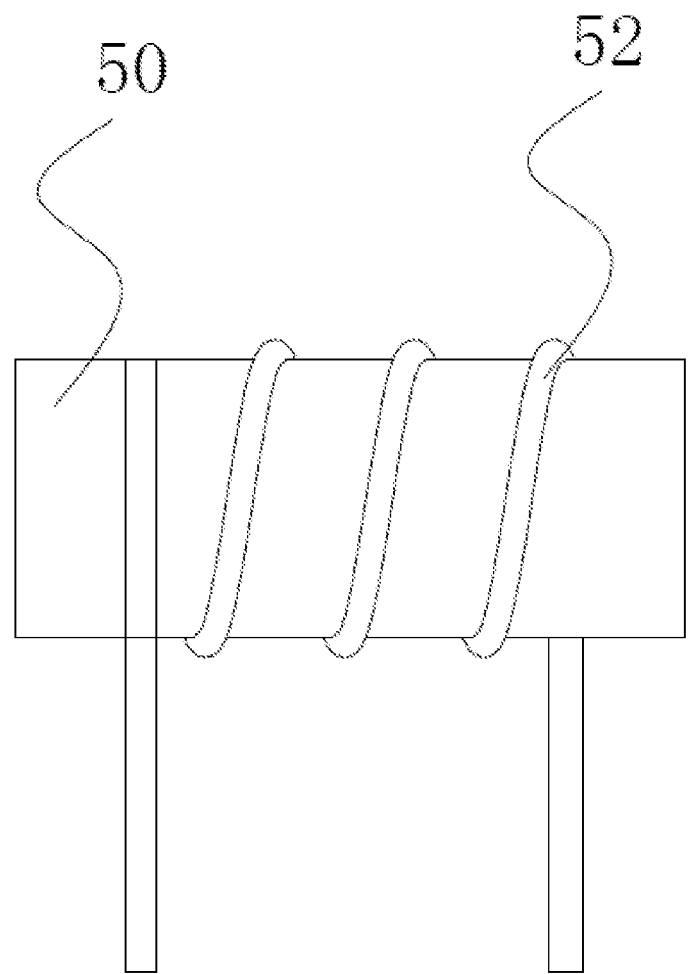
FIG. 5 is a structural view of a heating module of an electronic cigarette atomizer according to a fourth embodiment of the present patent application.

With reference to FIG. 5, FIG. 5 is a structural view of a heating module of an electronic cigarette atomizer according to a fourth embodiment of the present patent application. The heating module for the atomizer of the electronic cigarette comprises a ceramic rod 50 and a heating wire 52. Wherein, the ceramic rod 50 is set to be of a hollow micro-porous structure. The heating wire 52 is set to be made of a nichrome or titanium alloy material, and wound around the ceramic rod 50, and its winding degree is set according to a size of a resistance value.

Wherein, the heating wire 52 is directly joined to a lead of other elements connected to it by means of a welding manner. Compared with the prior art, the heating module for the atomizer of the electronic cigarette of the present patent application has advantages and positive effects. Firstly, a hardness of the ceramic rod of the present patent application is higher than that of an existing glass fiber rope, and thus after the heating wire is wound around the ceramic rod, a resistance value can be accurately controlled and a deviation of the resistance value is reduced. Secondly, the ceramic rod in the heating module for the atomizer of the electronic cigarette of the present patent application is set to be hollow and microporous, and thus tobacco tar from the electronic cigarette rapidly permeates in comparison with that of the prior art. Meanwhile, a ceramic material has a good heat conducting property, and thus a heat energy produced by the heating wire is uniformly distributed on the ceramic rod after it is energized and an atomizing effect of the tobacco tar from the electronic cigarette is relatively good in comparison with those of the prior art. Finally, the heating module for the atomizer of the electronic cigarette of the present patent application is simple in structure, can perform the automatic production and lower the cost.

The embodiments are applied herein to set forth the principle and the implementation of the present patent application above, it is appreciated that the foregoing embodiments are only used to help in understanding the present patent application, and should not be construed as limiting the present patent application. Those ordinarily skilled in the art can make variations to the above embodiments according to the idea of the present patent application.

What is claimed is:

1. A heating module of an electronic cigarette atomizer, comprising:
   a ceramic rod,
   a connecting element, and
   a heating wire,
   wherein the heating wire is wound around the ceramic rod; the connecting element is connected to two ends of the heating wire respectively; the ceramic rod is of a hollow micro-porous structure;
   wherein, the ceramic rod and the connecting element are integrally sinter-molded.

2. The heating module of the electronic cigarette atomizer according to claim 1, wherein, the connecting element comprises two metal rings, the two metal rings are disposed at two ends of the ceramic rod respectively, and two ends of the heating wire are respectively connected to the metal rings by welding or riveting.

3. The heating module of the electronic cigarette atomizer according to claim 1, wherein, an outer surface of the ceramic rod comprises a groove structure, the connecting element comprises two metal rings, the two metal rings and the ceramic rod are integrally sintered into a groove in the outer surface of the ceramic rod, and two ends of the heating wire are respectively connected to the metal rings by welding or riveting.

4. The heating module of the electronic cigarette atomizer according to claim 1, wherein, the connecting element comprises two metal terminals, and the two metal terminals are respectively connected with the heating wire by welding or riveting.

5. The heating module of the electronic cigarette atomizer according to claim 2, wherein, two ends of the ceramic rod comprise a step structure, and the metal rings are engaged in the step structure.

6. The heating module of the electronic cigarette atomizer according to claim 3, wherein, two ends of the ceramic rod comprise a step structure, and the metal rings are engaged in the step structure.

7. The heating module of the electronic cigarette atomizer according to claim 2, wherein, the heating wire is made of a nichrome material, a titanium alloy material or a galvanized steel alloy material.

8. The heating module of the electronic cigarette atomizer according to claim 3, wherein, the heating wire is made of a nichrome material, a titanium alloy material or a galvanized steel alloy material.

9. The heating module of the electronic cigarette atomizer according to claim 4, wherein, the heating wire is made of a nichrome material, a titanium alloy material or a galvanized steel alloy material.

10. The heating module of the electronic cigarette atomizer according to claim 2, wherein, the connecting element is made of a copper alloy material.

11. The heating module of the electronic cigarette atomizer according to claim 3, wherein, the connecting element is made of a copper alloy material.

12. The heating module of the electronic cigarette atomizer according to claim 4, wherein, the connecting element is made of a copper alloy material.

* * * * *